United States Patent
Wynalda, Jr. et al.

(10) Patent No.: US 7,798,321 B2
(45) Date of Patent: Sep. 21, 2010

(54) MEDIA STORAGE AND DISPLAY SLEEVE

(76) Inventors: Robert M. Wynalda, Jr., P.O. Box 370, Belmont, MI (US) 49306; Robert G. Rajter, Jr., P.O. Box 370, Belmont, MI (US) 49306

( * ) Notice: Subject to any disclaimer, the term of this patent is extended or adjusted under 35 U.S.C. 154(b) by 488 days.

(21) Appl. No.: 11/736,705

(22) Filed: Apr. 18, 2007

(65) Prior Publication Data

US 2007/0251843 A1 Nov. 1, 2007

Related U.S. Application Data

(60) Provisional application No. 60/793,297, filed on Apr. 18, 2006.

(51) Int. Cl.
*B65D 85/57* (2006.01)
(52) U.S. Cl. .............. 206/308.1; 206/1.5; 229/125.125; 220/345.5
(58) Field of Classification Search ............... 206/308.1, 206/309, 310, 311, 312, 313, 387.12, 1.5, 206/434; 220/345.5, 8, 4.24, 4.26, 4.27; 229/103.2, 125, 125.02, 125.31, 127, 130, 229/125.125, 125.12
See application file for complete search history.

(56) References Cited

U.S. PATENT DOCUMENTS

| 2,567,017 | A | * | 9/1951 | Gillespie | 229/130 |
| 2,887,263 | A | * | 5/1959 | Wright | 206/320 |
| 4,065,048 | A | * | 12/1977 | Pilz, III | 229/125.26 |
| 4,488,644 | A | | 12/1984 | Wynalda | |
| RE32,296 | E | | 11/1986 | Wynalda | |
| 4,761,629 | A | * | 8/1988 | Martin et al. | 336/208 |
| 4,838,422 | A | * | 6/1989 | Gregerson | 206/308.1 |
| 4,852,730 | A | * | 8/1989 | Thykeson | 206/145 |
| 4,982,857 | A | * | 1/1991 | Sher | 220/4.03 |
| 5,007,536 | A | * | 4/1991 | Huebner et al. | 206/394 |
| 5,088,599 | A | * | 2/1992 | Mahler | 206/308.1 |
| 5,472,138 | A | * | 12/1995 | Ingram | 229/198.2 |
| 5,511,659 | A | | 4/1996 | Bosworth | |
| 5,655,656 | A | * | 8/1997 | Gottlieb | 206/308.1 |
| 5,680,949 | A | * | 10/1997 | Roesler | 220/8 |
| 5,697,500 | A | * | 12/1997 | Walker | 206/509 |
| 5,746,314 | A | * | 5/1998 | Knutsen et al. | 206/308.1 |
| 5,799,784 | A | | 9/1998 | Bosworth | |
| 5,819,928 | A | * | 10/1998 | Wynalda, Jr. | 206/308.1 |
| 5,881,871 | A | * | 3/1999 | Ikebe et al. | 206/308.1 |
| 5,960,949 | A | | 10/1999 | Wynalda | |
| 6,186,349 | B1 | * | 2/2001 | Tempongko | 220/4.22 |
| 6,193,090 | B1 | * | 2/2001 | Connors et al. | 220/4.24 |
| 6,843,385 | B2 | * | 1/2005 | Gardi | 220/4.22 |
| 6,845,865 | B2 | | 1/2005 | Wynalda | |

(Continued)

FOREIGN PATENT DOCUMENTS

EP 546736 A2 * 6/1993

*Primary Examiner*—David T Fidei
(74) *Attorney, Agent, or Firm*—Zollinger & Burleson Ltd.

(57) ABSTRACT

A media storage and display sleeve is adapted to fit over a media storage container to provide a unique interactive marketing piece to be viewed and handled by the consumer. The sleeve includes an inner sleeve that receives the traditional media storage container and a pair of outer sleeves that slide back and forth over the inner sleeve between closed and open configurations. Stops are used to impede the outer sleeves from being readily removed from the inner sleeve.

9 Claims, 5 Drawing Sheets

U.S. PATENT DOCUMENTS

| | | |
|---|---|---|
| 7,028,835 B1 | 4/2006 | Rajter |
| 7,225,921 B2 | 6/2007 | Pelczarski |
| 7,328,790 B2 * | 2/2008 | Andersen .................. 206/232 |
| 2002/0153266 A1 * | 10/2002 | Havens ..................... 206/310 |
| 2003/0000854 A1 * | 1/2003 | Jang ...................... 206/308.1 |
| 2003/0098343 A1 * | 5/2003 | Ross ....................... 229/103.2 |
| 2003/0217939 A1 * | 11/2003 | Hegarty et al. ........... 206/308.1 |
| 2006/0151343 A1 * | 7/2006 | Cheung .................. 206/308.1 |
| 2006/0163090 A1 * | 7/2006 | Sugiyama ............... 206/308.1 |
| 2006/0283736 A1 * | 12/2006 | Ross ........................ 206/312 |

* cited by examiner

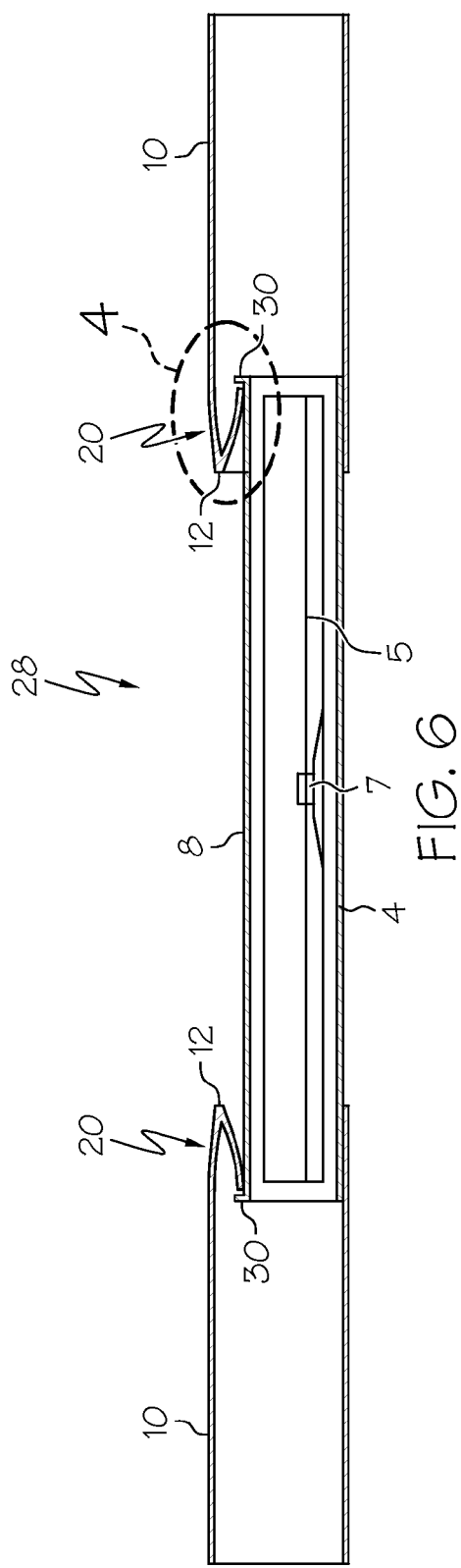
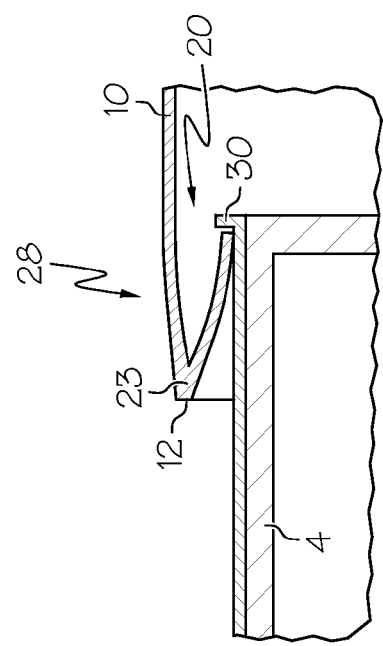

MEDIA STORAGE AND DISPLAY SLEEVE

CROSS REFERENCE TO RELATED APPLICATIONS

This application claims the benefit of U.S. Provisional Patent Application Ser. No. 60/793,297 filed Apr. 18, 2006; the disclosure of which is incorporated herein by reference.

BACKGROUND OF THE INVENTION

1. Technical Field

The invention generally relates to media storage containers and, more particularly, to promotional packaging for a media storage container. Specifically, the invention relates to promotional packaging for a media storage container that allows the user to physically interact with the packaging.

2. Background Information

Various media storage containers are known in the art. Some of the most common storage containers for recorded media are book-like containers having a lid connected to a base with a hinge. These containers typically allow a printed promotional slip sheet to be connected to the lid, hinge, and base where one surface of the sheet is viewable by the user. Those who manufacture and sell recorded media desire innovative packaging that attracts the consumer's attention while also providing space for printed information and the opportunity for consumer interaction with the packaging.

BRIEF SUMMARY OF THE INVENTION

The invention provides a media storage and display sleeve that is adapted to fit over a media storage container to provide a unique interactive marketing piece to be viewed and handled by the consumer. The sleeve includes an inner sleeve that receives the traditional media storage container and a pair of outer sleeves that slide back and forth over the inner sleeve between closed and open configurations. Stops are used to prevent the outer sleeves from being readily removed from the inner sleeve.

In one configuration, the media storage and display sleeve includes an inner sleeve that receives a media storage container and a pair of outer sleeves that slide back and forth over the inner sleeve. Stops prevent the outer sleeves from sliding directly off the inner sleeve. The stops include cantilevered tabs that engage to limit the relative movement of the sleeves. In an alternative embodiment of this configuration, one of the tabs is double thickness. The double thickness of the tab prevents pinching.

The invention provides another configuration wherein a media storage container functions as the inner sleeve and the outer sleeves slide back and forth directly over the storage container. Stops are used to limit the movement of the outer sleeves.

BRIEF DESCRIPTION OF THE SEVERAL VIEWS OF THE DRAWINGS

FIG. 6 is a view similar to FIG. 3 of an alternative embodiment of the invention.

FIG. 7 is an enlarged section view of a stop of the FIG. 6 alternative embodiment.

Similar numbers refer to similar parts throughout the specification.

DETAILED DESCRIPTION OF THE INVENTION

Figure 1:
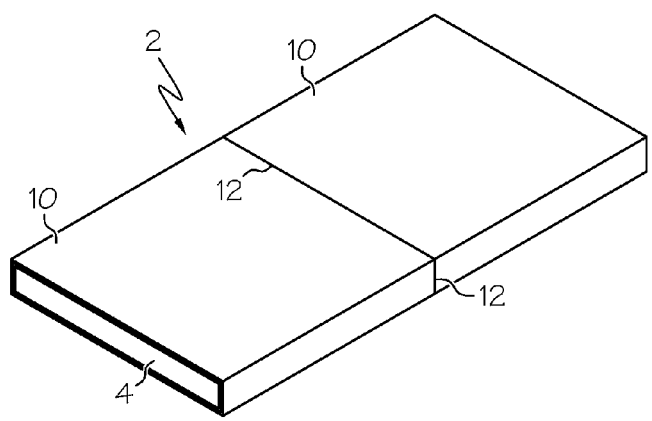
FIG. 1 is a perspective view of one configuration for a media storage and display sleeve with the two outer sleeves in the closed configuration.

A first configuration of the media storage and display sleeve is indicated generally by the numeral 2 in the accompanying drawings. The first configuration of sleeve 2 is configured to receive a traditional media storage container 4 such as a DVD container, a CD container, a VHS box, a video game cartridge container, a UMD (Universal Media Disc) container, or the like. Container 4 holds an item of recorded media 5 in the manner for which it was designed. For example, a DVD container 4 may include a hub 7 adapted to snap through the central opening in the DVD to hold the DVD in place. Sleeve 2 does not interfere or enhance the manner in which container 4 operates. Sleeve 2 is used to provide a plurality of interactive graphic display areas. Areas may be used to display information related to the item of recorded media stored within container 4. Areas also may be used to display information or graphics related to the manufacturer of sleeve 2, the distributor of container 4, the retailer who is selling container 4, or other promotional material such as a sweepstakes game or an instant-win game.

Sleeve 2 generally includes an inner sleeve 8 adapted to closely surround container 4 and a pair of outer sleeves 10 that closely surround and slide against inner sleeve 8. Sleeves 8 and 10 may be fabricated from paper-based (such as paperboard) materials. Sleeves 8 and 10 also may be fabricated from other materials such as plastics, metals, glass, or recyclable materials. Sleeves 8 and 10 may be formed (cut from sheets of material) flat and folded into the erected configurations shown in the drawings. When cut from blanks, the locations where sleeves 8 and 10 are folded may be scored or indented to make it easier to fold the flat blanks into sleeves 8 and 10.

Inner sleeve 8 defines a chamber that is configured to receive at least a substantial portion of container 4. Container 4 may be secured inside sleeve 8 with a connector which may be a mechanical or adhesive connector. In another configuration, inner sleeve 8 is configured to frictionally receive container 4 tightly enough to prevent container 4 from easily slipping from inner sleeve 8. In the configuration shown in the drawings, inner sleeve 8 is configured to be disposed tightly enough around container 4 to allow container 4 to be forced out of sleeve 8 with the user's fingers or a tool. In another configuration, container 4 may be held within sleeve 8 by appropriate holders. Such holders may include tape, clips, friction members, shrink wrap and other such devices. In another configuration, container 4 may be integrated with sleeve 8 such that sleeve 8 functions as part of container 4.

Figure 2:
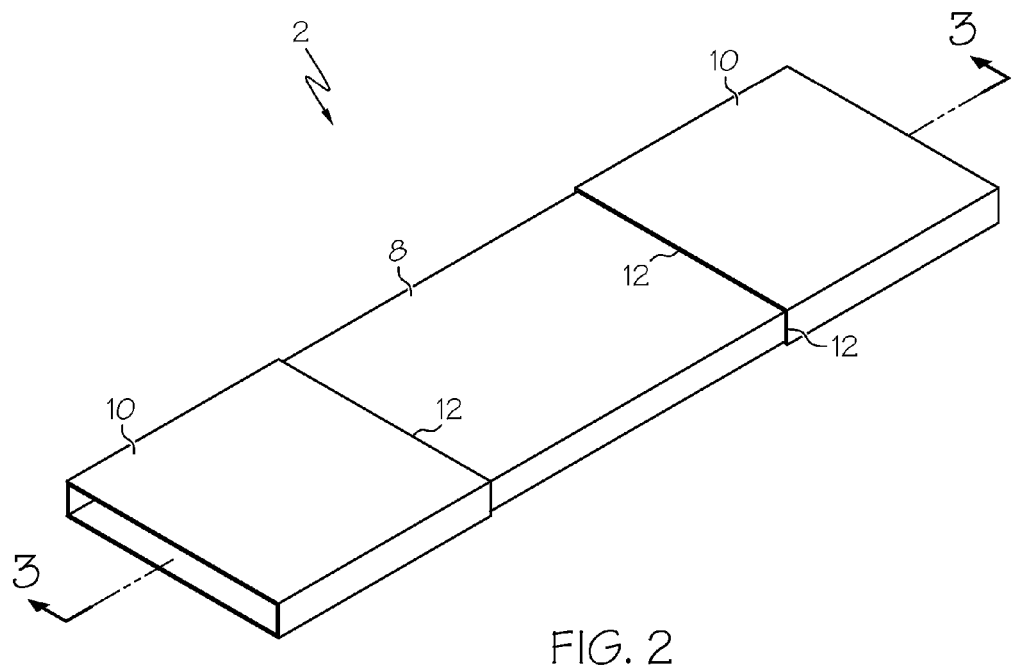
FIG. 2 is a perspective view of the FIG. 1 configuration with the two outer sleeves in the open configuration.
Figure 3:
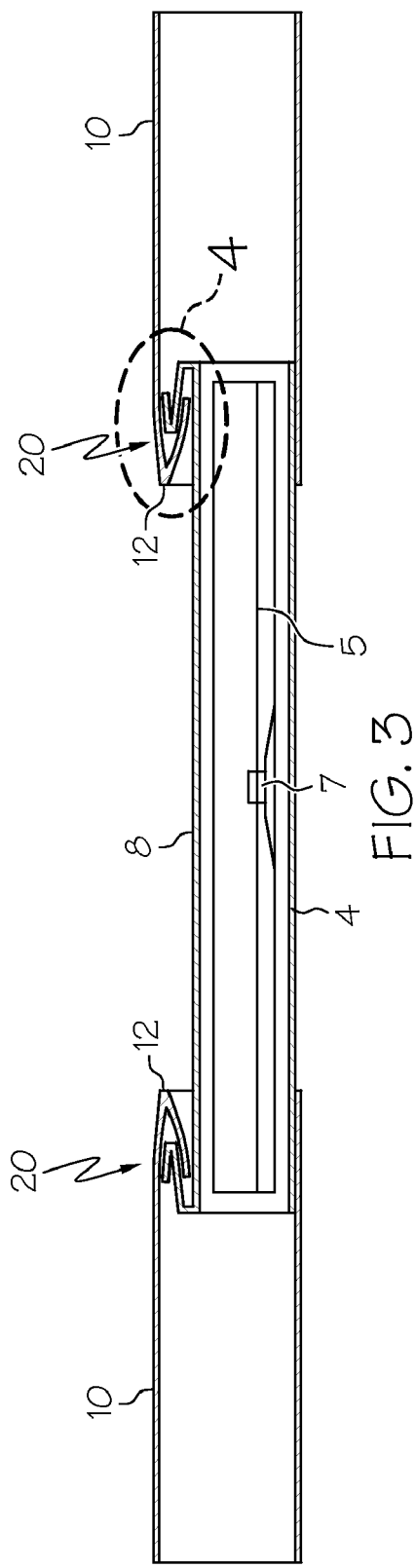
FIG. 3 is a section view taken along line 3-3 of FIG. 2.
Figure 4:
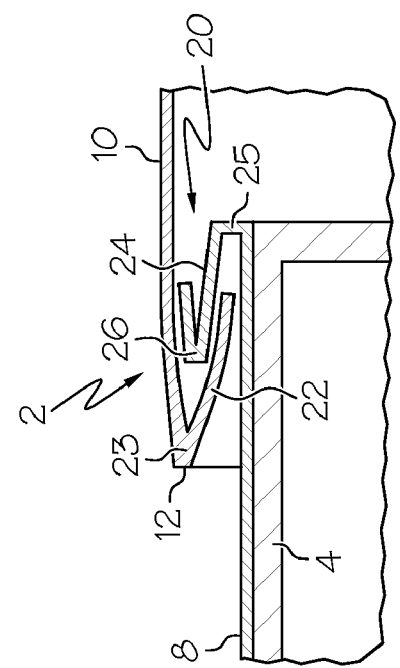
FIG. 4 is an enlarged section view of the interlocking tabs encircled in FIG. 3.
Figure 5:
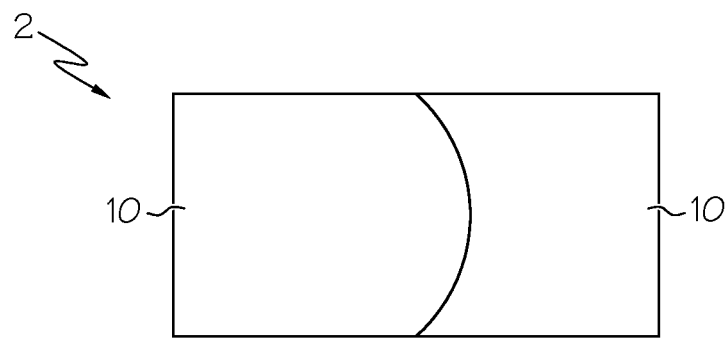
FIG. 5 includes FIGS. 5-5E which depicts a series of complementary end wall configurations.
Figure 5A:
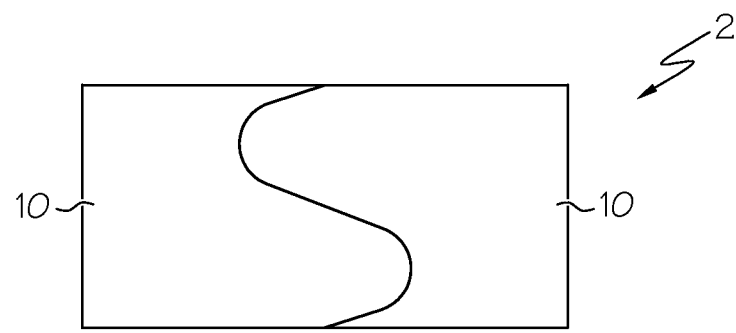
Figure 5B:
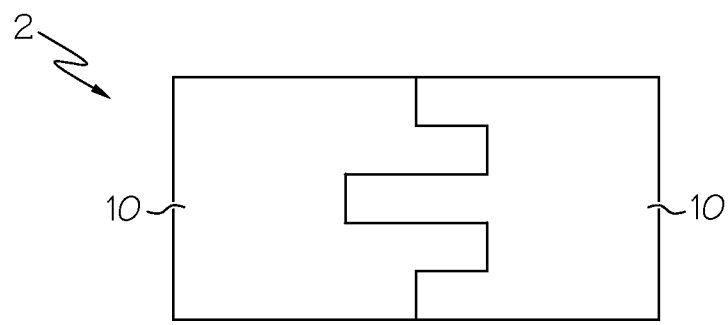
Figure 5C:
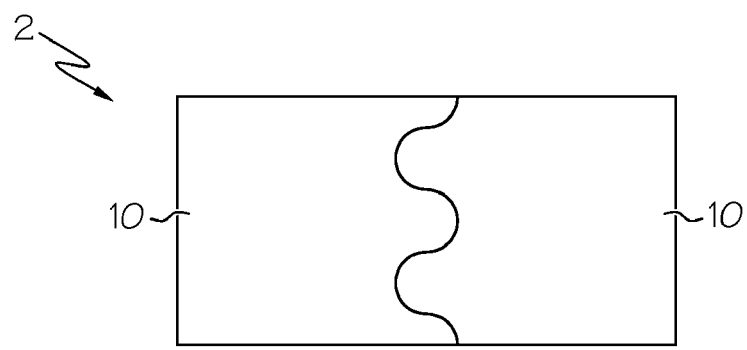
Figure 5D:
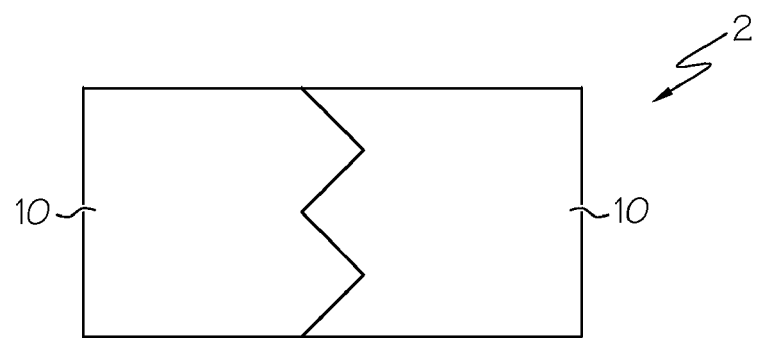
Figure 5E:
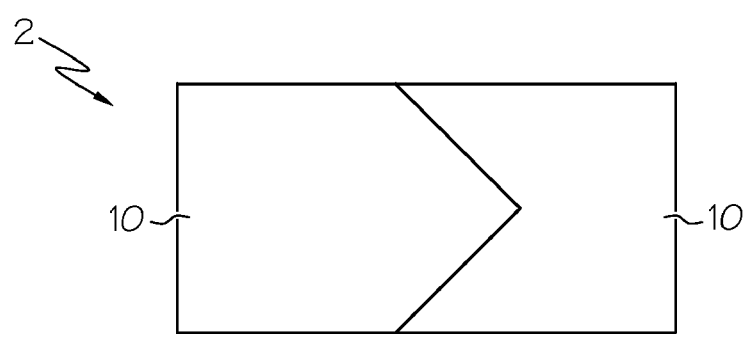

Outer sleeves 10 slide over inner sleeve 8 between closed (FIG. 1) and open (FIG. 2) configurations. In the closed configuration, outer sleeves 10 may completely hide the top, bottom, and side walls of inner sleeve 8. Outer sleeves 10 may frictionally engage inner sleeve 8 so that the relative position of outer sleeves 10 is frictionally maintained. Holders or ratchets also may be used to maintain the positions of outer sleeves 10. Each outer sleeve 10 has an inner end wall 12 that may abut each other when the outer sleeves 10 are in the closed configuration. End walls 12 may complement each other when outer sleeves 10 are in the closed configuration as shown if FIG. 5. In the exemplary configuration of FIGS. 1-4, end walls 12 are both perpendicular to the longitudinal direction of inner sleeve 8 and abut each other when outer sleeves 10 are closed. Other end wall configurations may be curved (FIG. 5), wavy (FIG. 5A, crenulated or interlocking (FIGS. 5B, 5D, and 5E), and wavy (FIG. 5C).

Display sleeve 2 includes a pair of stops 20 that impede outer sleeves 10 from sliding off the outer ends of inner sleeve 8. In the context of this application, stops 20 are considered to impede outer sleeves 10 from sliding off the ends of inner sleeve 8 even though stops 20 or sleeves 8/10 may be manipulated to allow complete separation of sleeves 8 and 10. Stops 20 may be in the form of cooperating tabs 22 and 24 that are integrally formed from sleeves 8 and 10. One or both or tabs 22 and 24 may be doubled over to prevent pinching. In the exemplary embodiment, tab 24 has two layers to increase the strength of tab 24 and to prevent tab 24 from becoming pinched inside tab 22. This configuration provides allows sleeve 10 to operate smoothly. Stops 20 also may be provided in alternative configurations such as stop walls, clips, or interlocking projections and depressions. Stops 20 are depicted on locations the top of sleeve 2 but may be disposed on the bottom, sides, or a combination of these locations.

In the exemplary embodiment of the invention, tabs 22 and 24 are formed by folding sections of material integral to sleeves 8 and 10. These sections are defined when sleeves 8 and 10 are cut into blanks from raw material sheets. Tab 22 is defined by creating a fold 23 to place tab 22 inwardly of the end of sleeve 10. In the embodiment of FIGS. 1-4, fold 23 defines inner end wall 12. When other end wall 12 configurations are used, tab 22 may be folded or connected with a connector such as an adhesive or a mechanical connector. Tab 24 is defined by creating at least one fold 25 to place tab 24 back over the top of sleeve 8 as shown in FIG. 4. A second fold 26 may be formed to double the thickness of tab 24.

Sleeve 2 provides graphic areas on the four outer surfaces of the inner sleeve 8 in addition to the four outer surfaces of both outer sleeves 10. This configuration essentially doubles the available surface for printing information as compared sleeve 8 alone. This configuration allows the inner and outer graphic areas to be related and creatively used to engage or entertain the user. In one example, the inner graphic can be an extension of the two outer graphics such that the inner and outer graphic areas combine to form a single graphic when the outer sleeves 10 are in the open configuration. The inner graphic may also be a graphic image that is logically subsequent to the outer image such that the user first comprehends the outer image and then opens the sleeves to see what the subsequent image reveals (such as a riddle and an answer—or different steps of a storyboard). Another configuration provides graphic images on the outer sleeves with text information about a company or a product on the inner sleeve (or vice versa).

FIGS. 6 and 7 depict an alternative embodiment 28 of the invention wherein container 4 functions as inner sleeve 8. Sleeve 28 includes container 4 and both outer sleeves 10 which slide back and forth between the open and closed configurations. In this embodiment, container 4 includes a projection 30 that functions as part of stop 20 to impede the removal of outer sleeve 10 from container 4.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A packaged item of recorded media comprising:
   a media storage container having an item of recorded media; the media storage container having an open condition wherein the item of recorded media may be removed from the container; the media storage container having a closed condition wherein the item of recorded media cannot be removed from the container;
   an inner sleeve having first and second ends; the inner sleeve having top, bottom, and side surfaces;
   the inner sleeve defining a chamber; a portion of the media storage container being disposed in the chamber; the media storage container being in the closed condition while disposed within the inner sleeve;
   the inner sleeve having an open end; the media storage container being removable from the inner sleeve through the open end of the inner sleeve;
   first and second outer sleeves carried by the inner sleeve and movable between open and closed positions; the open position of the outer sleeves exposing a portion of the top surface of the inner sleeve while maintaining the media storage container in the closed condition within the inner sleeve; the closed position of the outer sleeves hiding a portion of the inner sleeve from view; and
   stops that impede the removal of the outer sleeves from the inner sleeve.

2. The item of claim 1, wherein the stops include a tab connected to the inner sleeve and a tab connected to the outer sleeve; the tabs engaging to impede the removal of the outer sleeve from the inner sleeve.

3. The item of claim 2, wherein one of the tabs is folded over itself to define a portion having a double thickness.

4. The item of claim 3, wherein the inner and outer sleeve are fabricated from a paper-based material.

5. The item of claim 1, wherein the inner sleeve frictionally engages the media storage container.

6. A packaged item of recorded media comprising:
   a media storage container having an item of recorded media; the media storage container having an open condition wherein the item of recorded media may be removed from the container; the media storage container having a closed condition wherein the item of recorded media cannot be removed from the container;
   an inner sleeve having first and second ends; the inner sleeve having top, bottom, and side surfaces;
   the inner sleeve defining a chamber; a portion of the media storage container being disposed in the chamber; and
   first and second outer sleeves carried by the inner sleeve and movable between open and closed positions; the open position of the outer sleeves exposing a portion of the top surface of the inner sleeve while maintaining the media storage container in the closed condition within the inner sleeve; the closed position of the outer sleeves hiding a portion of the inner sleeve from view.

7. The item of claim 6, wherein the inner and outer sleeves define stops that impede the removal of the outer sleeves from the inner sleeve; each of the stops including a pair of tabs that engage each other.

8. The item of claim 7, wherein at least one of the tabs is folded over itself to form a portion having a double thickness.

9. The item of claim 6, wherein each of the first and second outer sleeves has a portion that is in the shape of a rectangular tube in cross section; the rectangular tube portions of the first and second outer sleeves entirely surrounding a portion of the inner sleeve.

* * * * *